United States Patent
Courcier et al.

(10) Patent No.: US 10,480,744 B2
(45) Date of Patent: Nov. 19, 2019

(54) LIGHTING SYSTEM FOR MOTOR VEHICLES

(71) Applicant: VALEO VISION, Bobigny (FR)

(72) Inventors: Marine Courcier, Bobigny (FR); Vanesa Sanchez, Bobigny (FR); Xavier Morel, Bobigny (FR); Jean-Luc Meyrenaud, Bobigny (FR); Stephan Sommerschuh, Paris (FR); Weicheng Luo, Paris (FR); Hafid El Idrissi, Pantin (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/759,905

(22) PCT Filed: Sep. 14, 2016

(86) PCT No.: PCT/EP2016/071702
§ 371 (c)(1),
(2) Date: Mar. 14, 2018

(87) PCT Pub. No.: WO2017/046168
PCT Pub. Date: Mar. 23, 2017

(65) Prior Publication Data
US 2018/0238512 A1  Aug. 23, 2018

(30) Foreign Application Priority Data
Sep. 14, 2015  (FR) .................................. 15 58584

(51) Int. Cl.
*F21S 41/675* (2018.01)
*B60Q 1/08* (2006.01)
(Continued)

(52) U.S. Cl.
CPC ............. *F21S 41/675* (2018.01); *B60Q 1/085* (2013.01); *F21S 41/141* (2018.01); *F21S 41/321* (2018.01);
(Continued)

(58) Field of Classification Search
CPC .............. B60Q 1/085; B60Q 2300/312; B60Q 2400/50; F21S 41/141; F21S 41/321;
(Continued)

(56) References Cited

U.S. PATENT DOCUMENTS 5,975,731 A * 11/1999 Saladin ................. F21S 48/145
362/303
2004/0213012 A1  10/2004 Fukawa et al.
(Continued)

FOREIGN PATENT DOCUMENTS

| EP | 0 976 973 A2 | 2/2000 |
| FR | 2 754 500 A1 | 4/1998 |

(Continued)

OTHER PUBLICATIONS

International Search Report dated Dec. 19, 2016, in PCT/EP2016/071702, filed Sep. 14, 2016.

*Primary Examiner* — Sisay Yacob
(74) *Attorney, Agent, or Firm* — Oblon, McClelland, Maier & Neustadt, L.L.P.

(57) ABSTRACT

A motor-vehicle lighting system including a device for projecting a low beam into a projection zone, wherein the projecting device is configured so that the low beam includes a zone of lesser illumination located in the interior of the projection zone. A preferred application is the field of lighting equipment for motor vehicles.

20 Claims, 6 Drawing Sheets

(51) Int. Cl.
*F21S 41/141* (2018.01)
*F21S 41/32* (2018.01)
*F21S 41/365* (2018.01)
*F21S 41/663* (2018.01)
*F21S 41/36* (2018.01)
*F21Y 115/10* (2016.01)
*F21W 102/20* (2018.01)

(52) U.S. Cl.
CPC .............. *F21S 41/36* (2018.01); *F21S 41/365* (2018.01); *F21S 41/663* (2018.01); *B60Q 2300/312* (2013.01); *B60Q 2400/50* (2013.01); *F21W 2102/20* (2018.01); *F21Y 2115/10* (2016.08)

(58) Field of Classification Search
CPC ........ F21S 41/36; F21S 41/365; F21S 41/663; F21S 41/675; F21W 2102/20; F21Y 2115/10
See application file for complete search history.

(56) References Cited

U.S. PATENT DOCUMENTS

| | | |
|---|---|---|
| 2007/0091629 A1 | 4/2007 | Fukawa |
| 2007/0103923 A1 | 5/2007 | Fukawa et al. |
| 2010/0017111 A1* | 1/2010 | Stefani ..................... B60Q 1/50 701/533 |
| 2014/0267415 A1* | 9/2014 | Tang ....................... G06T 11/60 345/633 |
| 2016/0161077 A1 | 6/2016 | Albou et al. |

FOREIGN PATENT DOCUMENTS

| | | |
|---|---|---|
| FR | 2 854 226 A1 | 10/2004 |
| FR | 3 008 477 A1 | 1/2015 |
| FR | 3 009 366 A1 | 2/2015 |

* cited by examiner

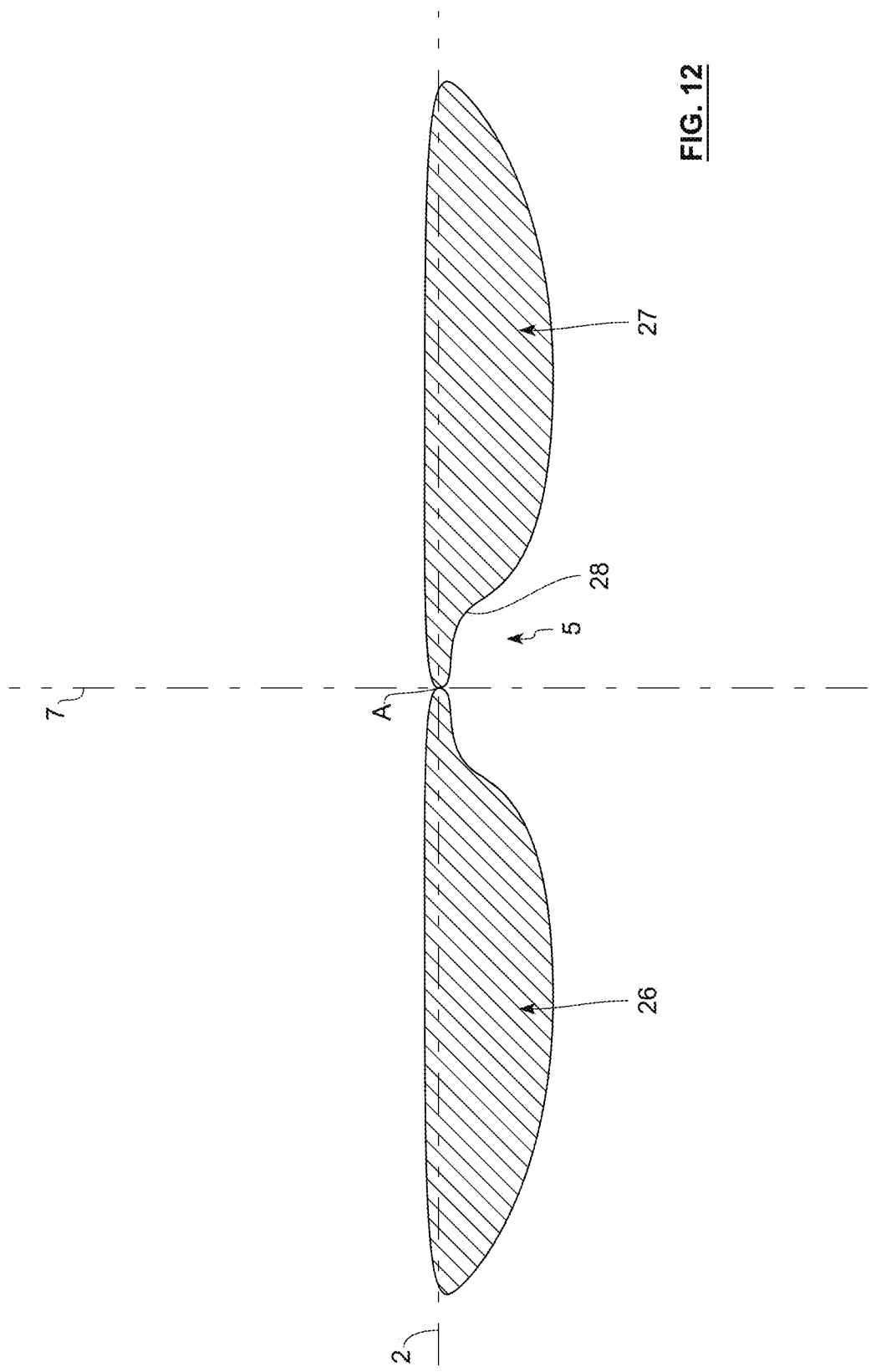

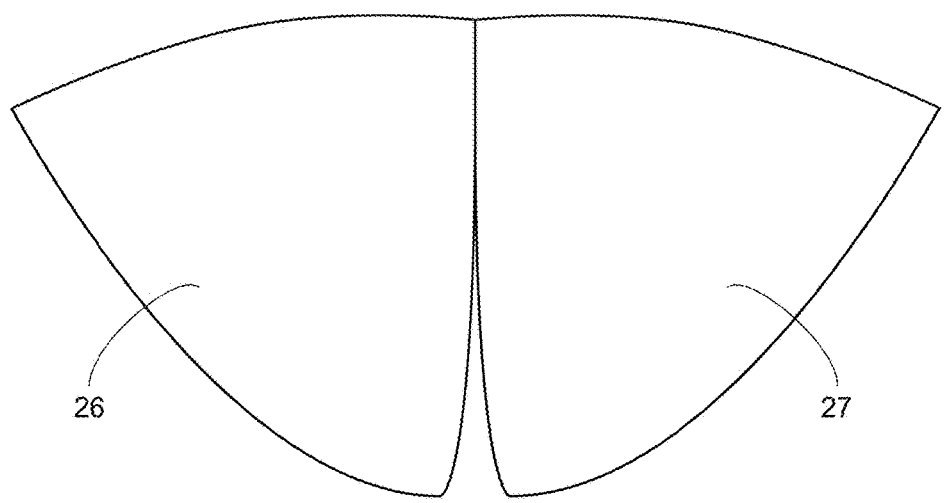
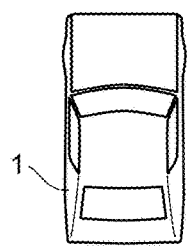
FIG. 13
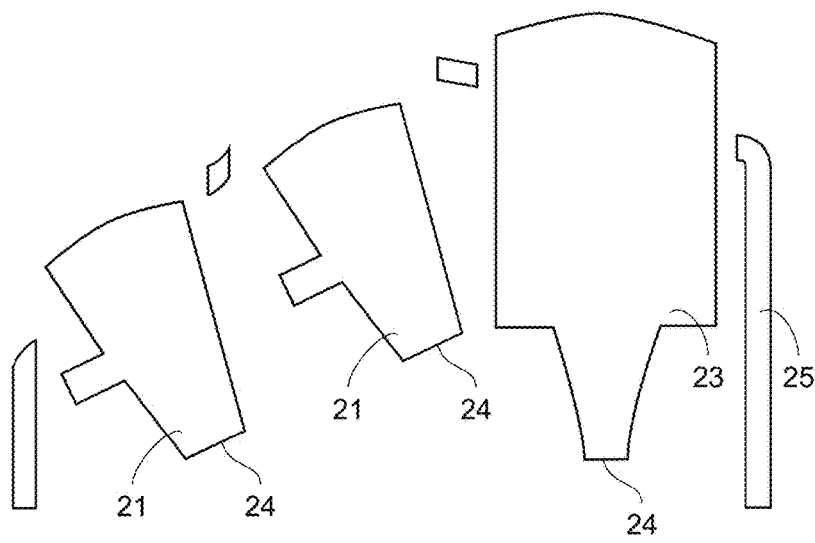
FIG. 14

LIGHTING SYSTEM FOR MOTOR VEHICLES

The present invention relates in particular to a lighting system.

A preferred application pertains to the automobile industry and regards equipment for vehicles and in particular the production of devices liable to be able to emit light beams, also referred to as lighting functions, that, in general, have to comply with regulations.

In particular, the invention may allow a low beam to be produced, alone or in combination with a signaling and/or lighting function of much lower intensity.

Known signaling and lighting devices have, up to the present day, been able to emit, for example:
- a low beam, i.e. a downward-directed beam, also sometimes called a dipped beam, and used in case of the presence of other vehicles on the road;
- a high beam devoid of cutoff, and characterized by a maximum illuminance on the axis of the vehicle;
- a light beam for when it is foggy, characterized by a flat cutoff and an illuminated area of large width; and
- a signaling beam for urban driving, i.e. what is also called a "town light".

The low beam is of paramount importance insofar as both the quality of the illumination and the absence of, or decrease in, the discomfort caused to other drivers by the generated light flux are dependent on the definition thereof being correct. Currently, low-beam lights are essentially defined in this context, with, in particular, recourse, vis-à-vis the top of the beam, to cutoffs, which are sometimes complex, to precisely limit or prevent illumination above the horizon line, and to optimize the design of a light-projecting zone to be left dark because liable to discomfort the driver of an oncoming vehicle.

There is however a need to improve the definition of low beams.

This is the context in which the invention was made.

The latter in particular relates to a motor-vehicle lighting system, including a device for projecting a low beam into a projection zone.

Advantageously, this system is such that the projecting device is configured so that the low beam comprises a zone of lesser illumination located in the interior of the projection zone. Thus, the low-beam light has a light intensity that is modulated dependent on position within the overall projection zone. This is advantageous in certain circumstances. One thereof relates to the case of heavy precipitation, the zone of lesser illumination causing less light to be reflected back toward the driver. Another situation relates to the concomitant projection of an additional beam. Specifically, the zone of lesser illumination may create a space propitious to the projection of another beam. This beam may in particular allow a sign, for example a pictogram, to be projected. Whereas the obvious way of proceeding would have been to superpose, on the low beam, a beam of higher intensity intended to form the sign, the solution of the invention consumes less power and is more flexible. Specifically, the zone of lesser illumination of the low beam may accommodate an additional projection of low intensity and in particular of intensity lower than that of the low beam. This feature furthermore means a range of technologies may be used to project the additional beam. It may be a question of techniques for projecting beams in the form of pixelized rays. These techniques, which are not always powerful in terms of light flux, allow beam shape to be chosen with a high degree of flexibility. They are usable here by virtue of the zone of lesser illumination of the invention.

According to one feature of the invention, provision may be made for the zone of lesser illumination to comprise an upper limit that is angularly offset with respect to an upper limit of the low beam by an angular value of at least 5° and preferably of at least 6°, with respect to the point of emission of the low beam, in a longitudinal and vertical plane.

According to an alternative that may instead be combined with any other aspect of the invention, the system comprises a device for projecting an additional beam formed from pixelized rays and configured to illuminate a zone that at least partially covers the zone of lesser illumination, the latter preferably, but nonlimitingly, comprising an upper border that is inclined by at least 5°, and preferably 6°, relatively to a horizontal plane.

Thus, in this version, the invention allows an additional projection, in the interior of the space occupied by the low beam. As a zone of lesser intensity is present, this additional beam may be less bright than the dipped beam such as projected outside of the zone of lesser illumination.

In a preferred case, the device for projecting an additional beam is formed from pixelized rays and is configured to illuminate a zone that at least partially covers the zone of lesser illumination. This technology offers a high resolution and allows various additional-beam shapes to be produced.

According to one embodiment, the device for projecting the low beam includes at least a plurality of modules that are each able to produce a sub-beam that participates in the low beam, the device for projecting the low beam optionally, but nonlimitingly, being configured so that the relative position of at least two sub-beams is modifiable between at least one position in which the zone of lesser illumination is present and at least one other position in which the zone of lesser illumination is absent.

This possibility allows the system of the invention to be placed in at least two different operating configurations. The first may represent the conventional low-beam position, with no zone of lesser illumination. The second corresponds to the presence of the zone of lesser illumination. Thus, the system may switch between two operating modes.

Other optional features of the signaling and/or lighting system according to the invention, which may be implemented in any combined association thereof or in an alternative way, are indicated below:
- the additional beam is configured to produce the outline of at least one pictogram;
- the zone of lesser illumination is entirely covered by the additional beam;
- the device for projecting an additional beam comprises a micromirror-array system;
- the zone of lesser illumination is symmetric about a vertical plane passing through the optical axis of the device for projecting the low beam;
- the zone of lesser illumination covers an angular sector of less than 10° in horizontal cross section;
- the average luminance in the zone of lesser illumination is lower by at least 70%, preferably at least 80%, more preferably at least 90% and preferably at least 97% than the average luminance in the rest of the projection zone of the low beam;
- the plurality of modules comprises at least one module that is configured to produce a rotatable sub-beam;
- the plurality of modules comprises at least one first group of at least one module located on a first side of the optical axis of the device for projecting the low beam, and a second group of at least one module located on another side of said optical axis;

the first group is optionally configured to illuminate only the first side of the optical axis and the second group is configured to illuminate only the second side of the optical axis;

each among the first group and second group may be configured to produce a beam comprising a segment of lesser illumination on a lateral beam edge located on the side of the optical axis, the segments of lesser illumination participating to form the zone of lesser illumination;

each among the first group and second group may be configured to produce a beam having a profile, in a vertical plane perpendicular to the optical axis, with a heightwise constriction in the direction of the optical axis;

the first group and second group are optionally configured to produce beams that are symmetric to one another relative to a vertical plane passing through the optical axis;

the relative position of the sub-beams respectively produced by the modules of the first group and by those of the second group may be modifiable;

the system comprises a third group of at least one module located along the optical axis.

The invention also relates to a vehicle equipped with a least one system such as introduced above. The vehicle may comprise two systems, each on a different side of the front portion of the vehicle.

The system may be integrated into a headlamp projecting unit.

Other features, aims and advantages of the present invention will become apparent on reading the following detailed description with reference to the appended drawings which are given by way of nonlimiting example and in which:

FIG. 1 schematically shows, via a profile view, the site of a projection of a low beam and the presence of a zone of lesser illumination;

Figure 6:
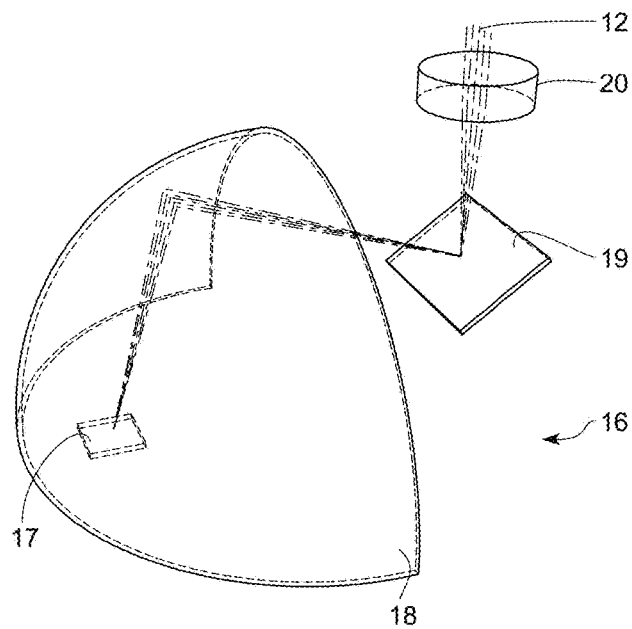
Figure 7:
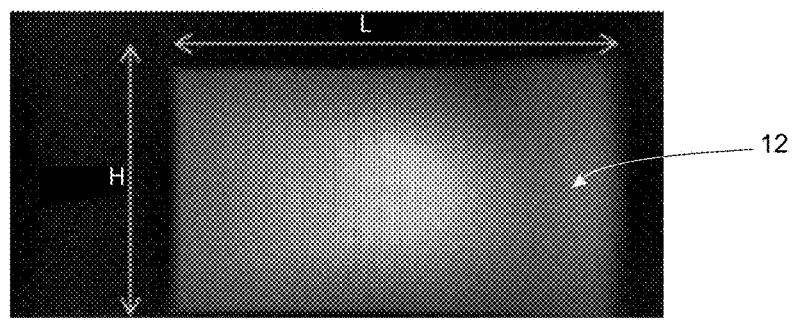
Figure 8:
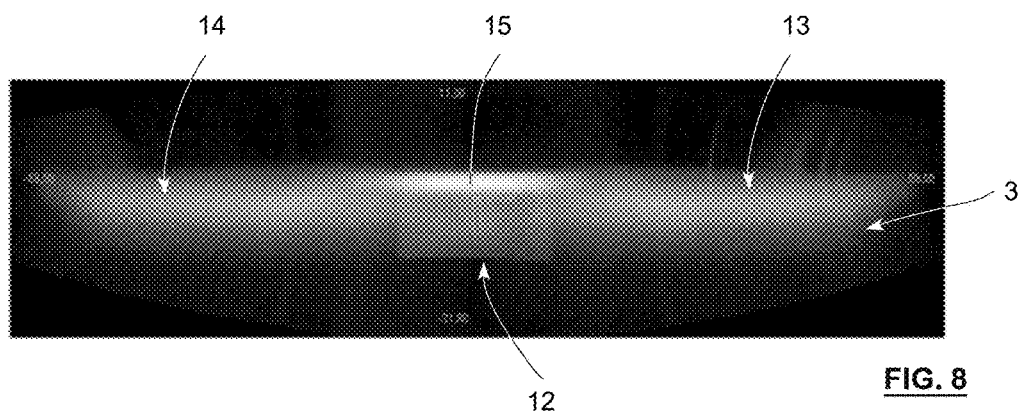
Figure 9:
Figure 10A:
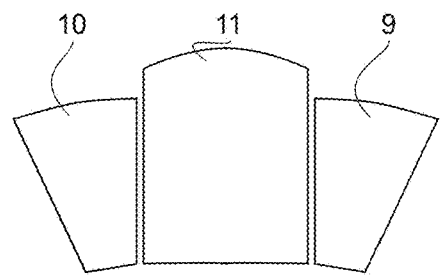
Figure 10B:
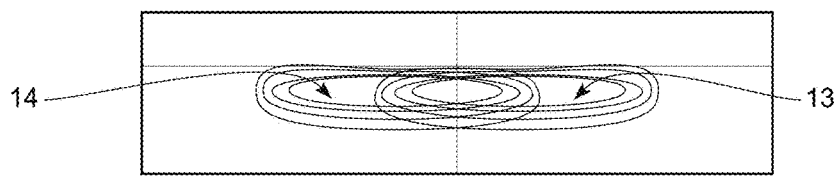
Figure 11A:
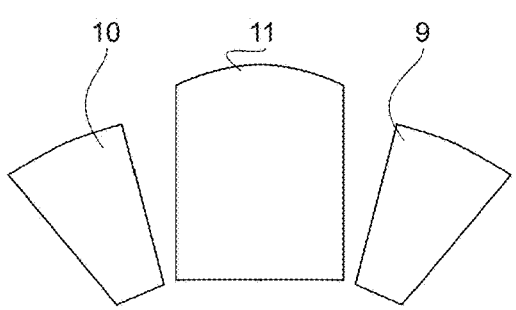
Figure 11B:
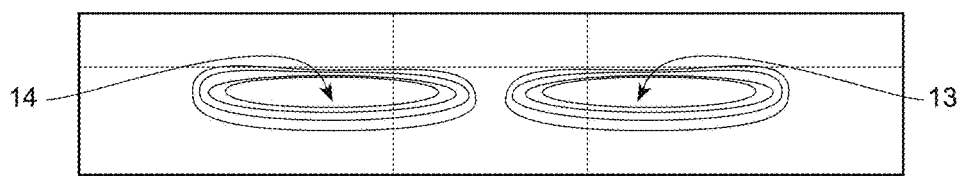

FIG. 6 presents an example of an optical module comprising a micromirror array;

FIG. 7 shows a possible shape of the additional beam;

FIG. 8 shows the association of the low beam and the additional beam;

FIG. 9 is a view of the projection of a pictogram in the additional beam during the projection of the low beam;

FIG. 10a shows a second embodiment of a device for projecting the low beam, this device being in a first position;

FIG. 10b is an isolux curve of two sub-beams of the beam projected in this first position;

FIG. 11a shows a second position of the projecting device in the second embodiment;

FIG. 11bis an isolux curve of two sub-beams of the beam projected in this second position;

FIG. 12 illustrates a view of vertical cross section of an example of a projection produced by a system according to another embodiment of the invention;

FIG. 13 lies within the scope of the embodiment of FIG. 12 and shows the result of a projection, seen from above; and FIG. 14 is an example of a group of modules able to form a portion of the desired overall beam, for the embodiment of FIGS. 12 and 13 in particular.

In the description of the features described below, terms relating to verticality, horizontality and to transversality, or their equivalents, are understood to be with respect to the position in which the lighting system is intended to be mounted in a vehicle. The terms "vertical" and "horizontal" are used, in the present description, to designate directions, the direction indicated by the term "vertical" having an orientation perpendicular to the plane of the horizon, and the direction indicated by the term "horizontal" having an orientation parallel to the plane of the horizon. These directions are to be considered vis-à-vis the conditions under which the device is used in a vehicle. The use of these words does not mean that slight variations about the horizontal and vertical directions are excluded from the invention. For example, an inclination relative to these directions of about + or −10° is here considered to be a minor variation about these two privileged directions.

The term "bottom" or bottom portion is generally understood to mean a portion of an element of the invention located, in a vertical plane, below the optical axis. The term "top" or top portion is understood to mean a portion of an element of the invention located, in a vertical plane, above the optical axis. The term "parallel" or the notion of coincident lines or axes is understood here to mean, in particular with the mounting or manufacturing tolerances, that directions that are substantially parallel or axes that are substantially coincident are included in their scope.

In the context of the invention, the expression "low beam" is understood to mean a beam employed when oncoming vehicles are present and/or when vehicles are being followed and/or when other elements (individuals, obstacles, etc.) are present on the road or nearby. This beam has a downward average direction. It may optionally be characterized by an absence of light above a plane inclined downward by 1% on the side on which oncoming traffic is found and of another plane inclined by 15° with respect to the preceding plane, on the side of traffic traveling in the same direction, these two planes defining a cutoff that is compliant with European regulations. The aim of this downward upper cutoff is to prevent other users present in the road scene lying in front of the vehicle or on the roadside from being dazzled.

Low beams, which once were generated by a simple headlamp, have undergone changes, the low-beam function possibly being coupled with other lighting characteristics. Thus, recently, new functions have been developed, these new functions being designated advanced functions and grouped together under the acronym AFS (abbreviation of Advanced Frontlighting Systems), which in particular provide other types of beams. It is in particular a question of the function called BL (Bending Light), which may be subdivided into a function called DBL (Dynamic Bending Light) and a function called FBL (Fixed Bending Light). These bending light functions are used when turning corners and are produced by means of headlamps that emit a light beam the horizontal orientation of which varies when the vehicle is following a curved path, so as to correctly illuminate the road sections that are going to be driven over by the vehicle and that are located, not on the axis of the vehicle, but in the direction that the vehicle is about to take as a result of the angle transmitted to the steered wheels of the vehicle by its driver. Another function is called a "Town Light". This function widens a low-beam light beam while slightly decreasing its range. The function called "Motorway Light" for its part is used when driving on freeways. This function increases the range of a low-beam light while concentrating the light flux of the low-beam light on the optical axis of the headlamp device in question. The function called "Overhead Light" is also known. This function modifies a typical low-beam light beam so that sign gantries located above the road are illuminated satisfactorily by means of the low-beam lights. Another low-beam light variant is the function called AWL (Adverse Weather Light). This function modifies a low-beam light beam such that the driver of a vehicle driving in the opposite direction is not dazzled by the reflection of the light from the headlamps on a wet road. In addition, when the low-beam lighting is in operation the pitch angle of the vehicle may undergo relatively substantial variations, depending for example on the load of the vehicle and its acceleration or deceleration, which variations cause the inclination of the upper cutoff of the beam to vary, this causing other drivers to be dazzled if the cutoff is raised, or the road to be insufficiently lit if the cutoff is lowered. It is thus known to use a manually or automatically controlled range corrector to correct the orientation of the low-beam headlamps. Generally, the low beam to which the invention relates comprises the regulation-compliant dipped beam and modifications thereto including those described above. Generally, the expression "low beam" may be understood to mean any beam that is inclined downward and/or that illuminates the road without extending significantly above the horizon line.

In the following description of the various embodiments of the invention, similar reference numbers will be used to reference similar concepts. Unless otherwise indicated, the technical features described in detail with regard to a given embodiment may be combined with all or some of the technical features described in the context of other embodiments, the embodiments being described by way of nonlimiting example.

Figure 1:
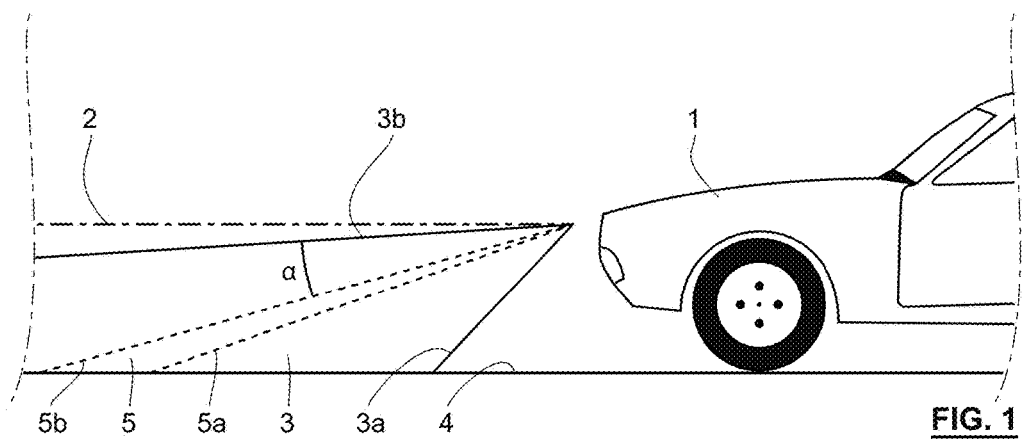

FIG. 1 schematically illustrates an example of a downward-inclined projection in front of a motor vehicle 1. In this example, which schematically shows the projection of a low beam 3, the latter is projected below a horizontal plane 2 so as to impact the road 4 in front of the motor vehicle 1. The reader may refer to the indications given above with respect to low beams as regards the projection characteristics of this beam. Overall, the low beam 3 includes an external envelope with a lower limit 3a, defining a limit of the envelope of the beam, this limit being the limit closest to the vehicle and corresponding to the greatest inclination relative to the horizontal plane 2, and an upper limit 3b corresponding to an upper limit of the envelope of the beam 3, this limit being the limit that is least inclined relative to the horizontal plane 2.

As indicated above, one aspect of the invention is to allow the low beam 3 to be defined in a specific or modifiable way. In this context, FIG. 1 also schematically shows the presence of a zone 5 that is able, in certain configurations of the system of the invention, to be a specific zone in the interior of the low beam 3 and in particular a zone of lesser illumination. Such as schematically shown, the zone 5 is bounded by a lower limit 5a and an upper limit 5b, which are represented by dashed lines and that define, in a longitudinal and vertical plane perpendicular to the horizontal plane 2, the minimum and maximum inclinations, respectively, of the envelope of the zone 5.

By lesser illumination, what is meant is that the average luminance in the zone of lesser illumination 5 is lower by at least 70%, preferably at least 80%, more preferably at least 90%, preferably at least 97%, and most preferably at least 99%, than the average luminance in the rest of the projection zone of the low beam 3. In other words, it is sought to have almost no light in this zone of lesser illumination. Thus, average light intensity values lower than 400 candelas, preferably lower than 100 candelas, advantageously lower than 50 candelas, and more preferably lower than 30 candelas will be measured in this zone of lesser illumination whereas in the rest of the beam, and in particular in immediate proximity to this zone, the values will be higher than at least 2000 or even 3000 candelas.

The position of this zone of lesser illumination 5 may vary in the interior of the low beam 3, and, by way of example, which example will be referred to again below, a lower limit 5a of the zone 5 could be coincident with the lower limit 3a of the low beam 3. It is particularly advantageous, in particular when this zone of lesser illumination is employed to project an additional beam 12 that it is desired for the driver to see, for the zone of lesser illumination to be placed in the interior of the low beam at a sufficient distance from the upper limit 3b of the low beam 3 for the upper portion of said zone to be bordered by a region of high brightness. In particular, provision will possibly be made for the zone of lesser illumination 5 to comprise an upper limit 5b that is angularly offset with respect to the lower limit 3b of the low beam 3, by an angle $\alpha$ (shown in FIG. 1) with respect to the point of emission of the low beam in the longitudinal and vertical plane illustrated in FIG. 1, the angle $\alpha$ having a value of at least 5°.

Figure 2:
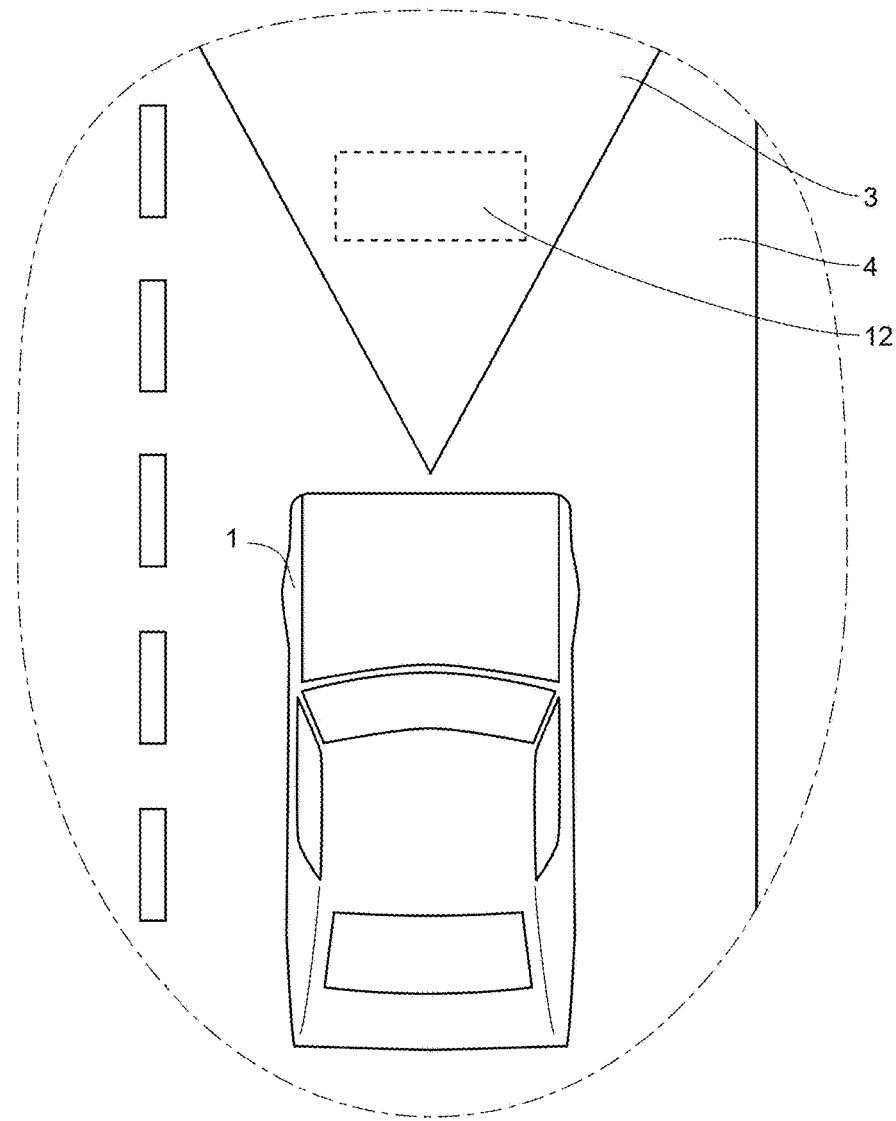
FIG. 2 shows this projection seen from above.

FIG. 2 is a top view of a motor vehicle 1 and of a zone located in front of this vehicle. In this example, the projection of an additional beam 12 in the interior of the low beam 3 has been shown by dashed lines, the additional beam 12 possibly being configured so as to cover all or some of the zone 5 presented above.

One aim of the invention is to make it so that the additional beam 12 makes use of the properties of the zone 5 to produce a specific signal or illumination in the interior of the low beam 3. Advantageously, the formation of the zone 5 is reversible in the sense that the definition of the low beam may be modified in order to remove this zone, or even to decrease its size, move it, enlarge it or modify its shape. Examples of implementation of this beam modification will be given in the description below.

In one preferred example, which was introduced above, the zone 5 is of lesser illumination relative to the rest of the low beam 3, i.e. it takes the form of a relatively dark shape in the interior of the projection zone of the low beam 3. The additional beam 12 may form a projection at least in this zone 5 so as, for example, to produce a complementary portion of the low beam 3, i.e. a portion that is complementary to a portion projected by a base headlamp for projecting the low beam 3, or even to form a projection parallel to the low-beam light for example in order to produce a sign such as will be described in detail below.

Figure 3:
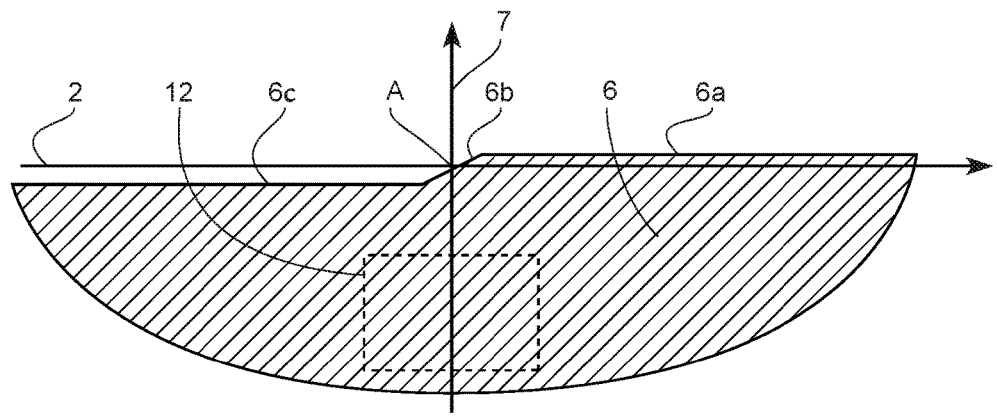
FIG. 3 illustrates, in a vertical plane, the low beam, which here, for example, contains a cutoff.

FIG. 3 is another illustration of the insertion, into a low beam that may be a conventional beam, of an additional beam 12. In this figure, the horizontal plane 2 is represented in the form of a horizon line on a vertical plane containing a vertical axis 7 that passes through the optical axis, which passes through the point A of the lighting system. Conventionally, the illuminated zone 6 of the low beam 3 may typically have an upper border that is substantially level with the horizontal plane 2 of the horizon line, and that has a first section corresponding to a high cutoff 6a, which is located slightly above the horizon, and a second section called the bottom cutoff 6c, which is located slightly below the horizon line, these two sections being joined by an intermediate section corresponding to a deviation 6b, here taking the form of an, in particular linear, zig-zag section, joining the sections 6a and 6c. In the example shown but nonlimitingly, the deviation 6b passes through the optical axis illustrated by the point A. The bottom portion of the envelope of the illuminated zone 6 of the low beam 3 may, on the whole, be a substantially convex and curvilinear section, a circularly arcuate or pseudo-elliptical section for example. It will be understood that this configuration allows blanket illumination of a zone located in front of and relatively close to the motor vehicle 1, and prevents an upward projection liable to dazzle the drivers of oncoming vehicles or of vehicles followed by the vehicle equipped with the system of the invention.

At the same time, the present invention may allow an additional functionality, such as the definition of a specific zone in the interior of the illuminated zone 6 described above, for example for the projection of an additional beam 12, such a beam being schematically illustrated by the dashed box in FIG. 3 only for the purposes of explanation. Specifically, the shape of the envelope of the additional beam 12 is not limited.

With a view to projection of the low beam 3 defining the illuminated zone 6, one possibility is to use a projecting device 8 that may optionally be of integral construction and that includes one or more optical modules 9, 10, 11 here shown assembled together even though each has an individual optical exit element.

Generally, the present invention may use, for all or some of the device for projecting the low beam, in particular as regards the modules 9, 10, 11, a light source, for example a light-emitting diode or LED. In particular, this LED may be equipped with at least one chip able to emit a light intensity that is advantageously adjustable depending on the signaling and/or lighting function to be provided. Moreover, the expression "light source" is here understood to mean an assembly of at least one elementary source such as an LED able to produce a flux leading to the generation, by way of output of the device of the invention, of at least one output flux providing at least one desired function. The source is generally associated with a carrier, connecting means and means for dissipating heat. Preferably, the source is configured to emit in an average emission direction that is perpendicular to the plane of the chip of the LED if this source technology is employed. The modules may comprise an exit dioptric interface via which the beam is emitted, for example taking the form of an external lens surface. Other types of sources are also envisionable for the invention, such as one or more laser sources, in particular in devices employing pixelized rays, such as the micromirror-array devices described below.

Figure 4:
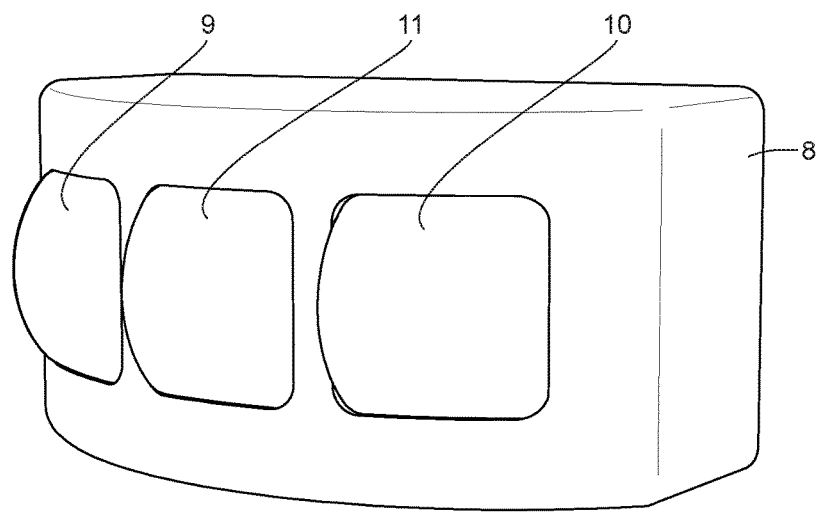
FIG. 4 shows a first embodiment of a device for projecting the low beam.
Figure 5:
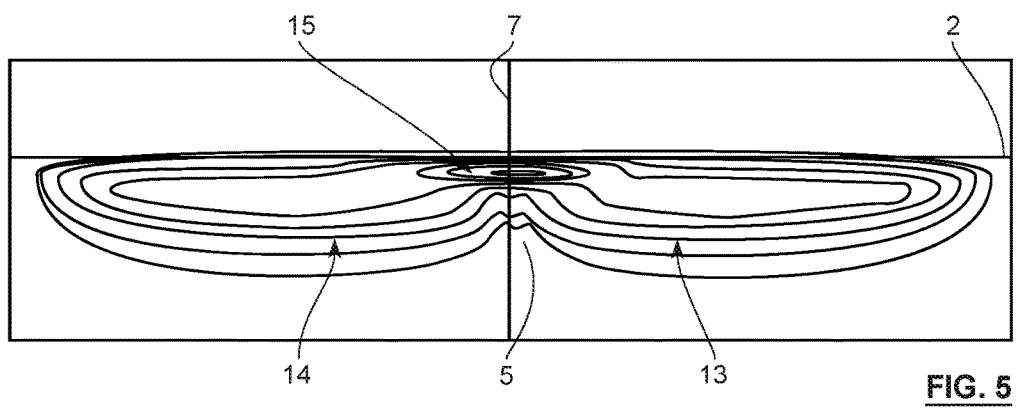
FIG. 5 is an isolux curve of the result of the projection of the low beam.

Thus, returning to the definition of the low beam 3, a projecting device 8 such as shown in FIG. 4 and comprising three modules 9, 10, 11 for example allows a beam to be formed, an isolux curve of which is shown in FIG. 5. In this figure, corresponding to a projection at a given distance from the vehicle, the formation of a first sub-beam 13 located on the right-hand side of the isolux curves, and for example taking the form of oval closed curves elongated into lines that are substantially parallel in a section of the space located on one side of the vertical axis 7, will be noted. This first sub-beam 13 may correspond to the result of the projection originating from the first optical module 9. Relatively similarly or even symmetrically, a second sub-beam 14 is projected and located in the case of FIG. 5 on the other side of the vertical axis 7 relative to the first sub-beam 13. This second sub-beam 14 may correspond to the result of the projection originating from the second optical module 10. It will be understood that the combination of the first and second sub-beams allows a more all-encompassing association that is substantially wider to be constructed. So as to obtain a zone of more intense illumination, particularly advantageously level with the optical axis, a third sub-beam 15 may be projected, although this example is nonlimiting. To this end, the third sub-beam 15 is here centered on the vertical axis 7 so as to produce a zone of higher intensity substantially toward the middle of the width of the low beam 3.

Advantageously, the projection of the third sub-beam 15 is configured so that the zone of higher intensity is located in the vicinity of the horizon line of the horizontal plane 2 and slightly therebelow. For example, the zone corresponding to the third sub-beam 15 may correspond to a height comprised between 20 and 50% of the height of the overall low beam 3 along the vertical axis 7. The third sub-beam 15 may be the result of the projection produced by the third optical module 11 shown in FIG. 4. It will be noted that in the example of FIG. 5, the isolux curves are constructed so that an inflection is present, in the example substantially on the vertical axis 7, and hence a less illuminated or even non-illuminated zone 5 is present in the low beam 3. In the case shown, the zone 5 covers a central bottom portion of the envelope of the illuminated zone so that, contrary to the case shown in FIG. 1, the lower limit 3a of the low beam 3 is coincident here with the lower limit 5a of the less illuminated zone 5. Thus, the present invention does not imply that the zone 5 is integrally encircled by a more brightly illuminated zone. In the particular case shown in FIG. 5, the less illuminated zone 5 corresponds to a central bottom portion of the envelope of the low beam 3, the lower portion of the zone of lesser illumination 5 not being bordered by a more brightly illuminated portion of the low beam 3.

According to one possibility, the zone of lesser illumination 5 may be used to limit the visual discomfort of the driver in certain driving situations and in particular in case of heavy precipitation. Specifically, these situations have a tendency to produce a partial reflection of the low beam, liable to dazzle the driver. The presence of a zone of lesser illumination, as such, allows this dazzling effect to be limited.

Another possibility covered by the invention consists in using the zone of lesser illumination 5 as a space for projecting the aforementioned additional beam 12. To this end, a device 16 for projecting an additional beam 12 formed from pixelized rays may in particular be employed. This device is advantageously designed to project the additional beam 12 at least partially into the zone of lesser illumination 5. This additional beam 12 may entirely or only partially cover the zone 5. It will moreover be understood that the present invention may allow a plurality of zones of lesser illumination 5 to be generated and that the explanations given with reference to the projection of one additional beam 12 may also apply to the projection of a plurality of additional beams 12, each additional beam for example being dedicated to one zone of lesser illumination 5.

With respect to the device 16 for projecting an additional beam 12, state-of-the-art techniques allow a beam, for example a collimated or convergent beam, formed from a plurality of individually controllable rays to be projected in such a way as to obtain a particularly precise and modifiable beam definition. To this end, a digital pixelized imaging system will possibly be used.

The expressions "digital pixelized imaging system", "pixelized-ray-generating imaging system" and their equivalents are understood to mean a system that emits a light beam, said light beam being formed from a plurality of sub-light beams, each sub-light beam being controllable independently of the other sub-light beams. Each independently controllable sub-light beam forms a pixelized ray. These systems may for example be micromirror arrays, in particular arrays of rotatably controllable micromirrors, or even liquid-crystal devices. Another technology for forming pixelized rays employs a laser source, the beam of which is scanned by a scanning device over a surface that is placed at the focal point of a projecting optic and that is composed of a plurality of luminescent elements, usually designated by the term phosphors. These luminescent elements re-emit white light, which is protected by a lens in order to form an illuminating beam on the road in front of the vehicle. The luminescent segments are placed between the laser source and the projecting lens, at the focal point of this lens.

FIG. 6 illustrates a nonlimiting example of a digital pixelized imaging system 16 that is what is called a Digital Micromirror Device (DMD), also referred to as a micromirror array.

The system comprises a light source 17, which may for example consist of LEDs or even laser diodes, or any sort of light sources. This light source 17 emits a light beam advantageously in the direction of a reflector 18. This reflector 18 is preferably configured to concentrate the incident light flux on a surface containing the micromirror array 19.

Advantageously, the reflector 18 is configured so that all of the micromirrors are illuminated by the light beam reflected by the reflector 18. The reflector 18 may have, in at least one cross-sectional plane, a pseudo-elliptical or pseudo-parabolic profile.

Once reflected by at least some of the micromirrors, the light beam passes through a dioptric element 20. Advantageously, this dioptric element 20 may be a convergent lens for example.

As indicated, after reflection of the light beam from the reflector 18, the latter is concentrated on the micromirror array 19. Preferably, the micromirrors each have two operating positions, a position called the active position in which they reflect the incident light beam in the direction of the dioptric element 20, and a position called the passive position in which they reflect the incident light beam in the direction of a light-absorbing element, which is not shown in FIG. 6.

This type of device allows a highly resolved pixelized digital light beam to be output from the dioptric element 20: each component pixel or pixelized ray of this beam corresponds to one micromirror, and it is then possible to activate or deactivate these micro-pixels simply by controlling the micromirrors. This particularity then allows if necessary the shape of the light beam output from the dioptric element 20 to be configured depending on the needs of the invention.

For example, it is possible to activate only some of the micromirrors in order to form a cutoff in the light beam output from the dioptric element 20. This cutoff allows, inter alia, the functions presented above to be provided.

FIG. 7 illustrates an example of an additional beam 12 produced by a device of the type shown in FIG. 6 and as described above. The additional beam 12 is of rectangular shape, this shape advantageously being tailored so that the area of the additional beam 12 covers the zone of lesser illumination 5 defined in the interior of the low beam 3. Typically, the additional beam 12 has a length "L" and a height "H", the length "L" possibly for example corresponding to an angular sector of the additional beam 12, measured in a horizontal plane and of an amplitude for example comprised between 4 and 25° and in particular of 20°. In terms of height "H", the latter may correspond, in a vertical plane, to an angular sector comprised between 5 and 20° and in particular of 12°. Such as shown, the additional beam 12 is very finely defined by virtue of the use of the digital pixelized imaging system.

FIG. 8 shows the result of associating the additional beam 12 and a projection originating from the device 8 for projecting the low beam 3.

As was the case in FIG. 5, the first and second sub-beams 13, 14 form lateral wings of the low beam 3 as well as a zone, corresponding to the third sub-beam 15, of higher light intensity substantially level with the upper end of the overall beam, this zone being relatively centered on the optical axis. The additional beam 12 appears below the third sub-beam 15 in the form of a section of rectangular shape allowing a luminous signal to be superposed on the beam originating from the projecting device 8.

FIG. 9 shows a practical use of the additional beam 12. The device 16 for projecting the additional beam in the form of pixelized rays has been controlled so as to generate a dark zone in the additional beam 12, this zone corresponding to the outlines of a pictogram 21. Thus, it is enough, in the context of a DMD device, to control certain micromirrors to their inactive position to create a dark zone in the interior of the additional beam 12 and thus generate a piece of graphical information. It is obviously possible to generate a plurality of pictograms 21 and to modify the control of the imaging device in order to alternately project a plurality of different pictograms depending on the desired information. The projection of a pictogram may be related to a piece of information received from a system integrated into the vehicle, for example a navigation system or a control system that is able to trigger the emission of safety-related information. The pictogram 21 may be defined in positive or negative in the beam 12.

It will be recalled that the presence of an additional beam 12 is not a limiting feature of the invention. Moreover, one aspect of the invention relates to the ability to pass from a situation in which a zone of lesser illumination is present to a situation in which this zone is absent. According to this aspect, it is also moreover optionally possible to modify the zone of lesser illumination 5 depending on the desired applications, and in particular depending on the shape of the additional beam 12 to be projected into the interior of the zone of lesser illumination 5. To achieve this objective, according to one aspect that is separable from any other aspect of said zone, the device 8 for projecting a low beam is configured so as to allow a low beam 3 that may be switched at least between two configurations to be produced. This device is such that the relative position of at least two sub-beams is modifiable. FIGS. 10a to 11b illustrate this capacity. In the case of FIG. 10a, a projecting device 8 including a first module 9 located on one side of the optical axis, a second module 10 located on the opposite side of the optical axis and a third module 11, or central module, located between the two preceding modules, has been shown.

In this configuration, the result of the projection originating from the first and second modules 9, 10 corresponds to the isolux curves schematically shown in FIG. 10b. In this figure, the first and second sub-beams 13, 14 originating from the first and second modules 9, 10, respectively, overlap, preferably about a vertical plane passing through the optical axis. In this configuration, the overall result of the projection is a beam that, as regards the definition of its envelope, contains few discontinuities.

FIG. 11a shows a different arrangement of the modules 9, 10 of the projecting device 8, in which arrangement the inclination of the modules 9, 10 has been modified relative to the position of the central module 11. The result of this modification in position is shown in FIG. 11b. In this figure, it may be seen that the isolux curves corresponding to the projection of the first sub-beam 13 and to the projection of the second sub-beam 14 originating from the first and second modules 9, 10, respectively, are further apart in a width direction of the beam. In the example shown, the separation is such that the first and second sub-beams 13, 14 no longer overlap. Therefore, a zone of lesser illumination may be created in the intermediate space. It will be noted that for the sake of simplicity the curves shown in FIGS. 10b and 11b do not show the third sub-beam 15 originating from the third module 11.

However, it will be understood that even with the projection of the third sub-beam 15, a zone of lesser illumination 5 would remain present between the first and second sub-beams 13, 14, in a lower section of the envelope of the low beam thus created.

The invention is not limited to any one mode of modifying the relative configuration of the sub-beams of the device 8 for projecting the low beam 3. Thus, the modification may be produced by moving a module or a portion thereof. For example, modifying the position of the exit dioptric element of a module, for example rotationally, may suffice to achieve the modification of configuration. It may be a question of a rotation applied to a projecting lens or to an exit reflector. The mobility of the module or of a portion thereof may in particular be a pivot about one or more axes. According to one possibility, the mobility of the sub-beam in question is oriented about a vertical axis. In the example of FIGS. 10a and 11a, both modules 9, 10 are moreover moved. These movements may be substantially symmetric, i.e. the modules 9, 10 are moved, about a vertical pivot, by an equivalent or symmetric angular sector relative to a vertical plane containing the optical axis.

The third module 11 could itself be movable, for example about a horizontal pivot axis, in order to lower or raise the projection of the third sub-beam 15 slightly and thus modify the amplitude and/or the position of the zone of lesser illumination 5.

It will moreover be noted that this aspect of the invention allows the shape and possible overlap of the sub-beams making up the low beam 3 to be modified. It is for example possible to increase or decrease the width of the low beam 3, or to increase or decrease the overlap of a plurality of sub-beams so as to vary and in particular decrease the resulting light intensity in certain locations and thereby produce a zone of lesser illumination 5.

According to another aspect of the invention (which aspect has not been illustrated), more than three modules are present in the device 8 for projecting the low beam 3. For example, in order to increase the luminous power resulting from the sub-beams, a plurality of modules are located on one side of the optical axis and a plurality of modules are located on the other side of the optical axis. Thus, in contrast to what is shown in FIGS. 10a and 11a, instead of the module 9, a group of modules comprising at least two modules is used. A similar situation would apply to the module 10. Advantageously, the groups of modules located on either side of the optical axis have a mobility about the same pivot axis, the angular sector of this mobility possibly being identical or different.

As above, the "mobility" of the modules is understood to mean that at least one portion of each module is moveable, this mobility allowing the direction of the corresponding sub-beam to be modified.

Provision will possibly be made, without departing from the context of the invention, for the projecting device to be equipped with a first module or group of modules 9 that is identical to the second module or group of modules 10, or indeed for each of these two modules or group of modules to be clearly identified and arranged to form a left-hand module or group of modules and a right-hand module or group of modules. Depending on the light source used (laser source, light-emitting diode, etc.) and on the emission power of these sources, and on the total light flux required by a given projecting device, the modules will possibly be equipped with one or more lenses.

Of course, in the context of the invention, to define the zone of lesser illumination 5, it is not essential for the relative position of sub-beams composing the low beam to be modifiable. For example, this zone may be defined fixedly so as to be unable to pass from a position in which it is present to a position in which it is absent. By way of illustration, the device 8 for projecting the low beam 3 may comprise a light source (for example a xenon or halogen light source) or even an LED light source (the number of individual sources comprised in said light source not being limited to one) and a single reflector of complex surface, this reflector being configured to generate, by reflection, a hole so that the reflected beam contains the zone of lesser illumination 5. Another option is to form a plurality of modules in the interior of the device 8 for projecting the low beam 3, with for example three reflectors, each associated with one module and projecting one portion of the beam, at least one of the reflectors being configured to comprise a zone of lower or zero reflection, so as to create a hole in the resulting sub-beam and the zone of lesser illumination 5 as output. In this arrangement, each reflector may furthermore produce a portion of the upper border of the low beam i.e. of the cutoffs 6a, 6b, 6c.

As is customary, possible applications of the zone of lesser illumination 5 and of the projection of an additional beam 12 have been indicated. It will be noted that the device and the system of the invention may be controlled between their various configurations dependent on exterior parameters. For example, on detection of precipitation or when the windshield wipers are turned on, the system of the invention may be configured so as to modify the configuration of the low beam 3. This modification will serve to create or increase the area of the zone of lesser illumination 5. As regards the additional beam 12, examples related to navigation and to the display of safety information were given above by way of indication.

FIGS. 12 to 14 moreover show another embodiment of the invention. It will be noted that all or some of the features presented in the embodiment of these figures may be combined with all or some of the features presented in the case of the embodiments described above. Whereas in the preceding embodiments use of a right-hand group and left-hand group of modules having substantially the same properties was preferred i.e. the final beams were substantially identical in terms of shape and size, the embodiment of FIGS. 12 to 14 allows, in a preferred case, the shape of a right-hand beam and the shape of a left-hand beam to be different. More particularly, it is advantageous for the shape of these two beams to at least partially ensure the generation of the zone of lesser illumination 5.

It will be noted that this embodiment has the advantage of avoiding the need to manage an overlap between a group of modules placed on the left-hand side of the vehicle and a group of modules placed on the right-hand side of the vehicle, these two groups being intended to generate substantially equivalent beams. Specifically, in this particular case, problems may arise with parallax and hinder the generation of a zone of lesser illumination that is clear and contrasted. The principle of the embodiment of FIGS. 12 to 14, allowing a group of modules to be dedicated mainly to generation on the left-hand side and a group of modules to be dedicated mainly to generation on the right-hand side solves this difficulty.

FIG. 12 shows a cross-sectional view, in a vertical plane perpendicular to the optical axis A, of one possible beam profile with which the low beam 3 may be formed. In this figure, the optical axis A cuts the plane of the illustration at an intersection between a vertical axis 7 and a horizontal line 2. A first beam 26, located on the left, is illustrated and positioned, on the whole, in a quadrant, the top of which is defined by the horizontal line 2 and the right-hand border of which is defined by the vertical axis 7. A second beam 27, located on the right, is also illustrated and is positioned, on the whole, in a quadrant, the top of which is defined by the horizontal line 2 and the left-hand border of which is defined by the vertical axis 7.

The left-hand beam 26 and the right-hand beam 27 are preferably, but nonlimitingly, symmetric to one another relative to a vertical plane containing the optical axis A and the vertical line 7. This plane advantageously corresponds to a midplane of the vehicle. However, the beams 26, 27 are preferably each asymmetric in themselves in order to preserve a section of lesser illumination toward the center of the final low beam.

Moreover, at least one, but preferably both, of the beams 26, 27 preserve a section of lesser illumination in an area located in the vicinity of the optical axis A, this section of lesser illumination participating in the zone of lesser illumination 5. In the embodiment illustrated in FIG. 12, the beams 26, 27 each produce an illumination that is bordered at the top by the horizontal line 2, which corresponds to the horizon line. This illumination extends from a lateral edge, located to one side of the vehicle, to a central edge that is preferably located on the optical axis A. A main section of the illumination produced may have a convex profile the convexity of which is directed downward, so as to produce a curved shape such as illustrated in FIG. 12. Preferably, this convexity does not continue as far as to the lateral edge 28, which is located in the vicinity of the optical axis A, so as to create a hole in the illumination produced. Thus, preferably, a section of the lateral edge 28 here includes a constriction, for example formed by a concave curvilinear line, or even an inclined section, so as to leave a section of lesser illumination free when the beam 26 or 27 is moved closer to the zone located level with the vertical 7.

Preferably, each of these two beams produces an essentially horizontal beam section in the vicinity of the optical axis A, for example taking the form of a "handle" as in the case of the illustrations in FIG. 12. The illustrated configuration is nonlimiting and any beam shape 26, 27 allowing a non-illuminated or less illuminated space to be left free level with the lateral edge 28 of these beams in proximity to the vertical line 7 may be used.

Moreover, it is not absolutely necessary for the beams 26, 27 to extend as far as to the optical axis A. A non-illuminated central section may be preserved here or illuminated by another projecting module integrated or not into the system of the invention. In contrast, it is possible for the beams 26, 27 to overlap level with the vertical plane passing through the optical axis A. Thus, in the context of the invention, the beam 26 is called the left-hand beam in the sense that it is mainly located on a left-hand side of a vertical plane passing through the optical axis A. This does not mean that the left-hand beam will not partially illuminate a right-hand side of said plane. The inverse goes for the beam 27, which is called the right-hand beam.

Another representation of a result produced by the projection of two beams 26, 27 is given in FIG. 13 seen from above. In this configuration, the beams 26, 27 converge slightly toward infinity so as to produce a central illumination; however, a zone of lesser illumination 5 is preserved about the optical axis A in proximity to the vehicle 1.

FIG. 14 gives an example of a group 20 of modules usable to form the left-hand beam 26 described above. It will be understood that a group 20 of modules may be formed in a corresponding way, and advantageously symmetrically, for the right-hand beam 27. The group 20 includes a body 25 allowing at least one module allowing the beam to be generated 26 to be held and encased. In the illustrated example, three modules 21, 22, 23 are present. For example, the module 23 may allow the section of the beam 26 including the constriction in the direction of the vertical plane containing the optical axis to be generated. This constriction may for example be obtained by virtue of a suitable lens and/or a shield and/or a reflector of shape allowing light beams not to be projected, or such a projection to be limited, in the zone corresponding to the constriction. Any technique for forming a cut-off will possibly be used in this context.

Again by way of example, the other modules 21, 22 may be employed to generate the illumination of the rest of the beam 26.

In FIG. 14, the modules 21, 22, 23 are each equipped with a light source 24 for example taking the form of LEDs.

The example given in FIG. 14 is nonlimiting and a group of a single module could suffice for each side of the vehicle 1. Moreover, this embodiment is compatible with a mobility of all or some of the modules, so as to make the configuration of the beams 26, 27 vary depending on the desired mode of use. For example, the beams 26, 27 may be brought closer together in the direction of the optical axis A so as to decrease or suppress the zone of lesser illumination 5.

The invention is not limited to the described embodiments but encompasses any embodiment conform to its spirit.

The invention claimed is:

1. A motor-vehicle lighting system comprising:
   a device for projecting a low beam into a projection zone, wherein the projecting device is configured so that the low beam comprises an interior zone within the projection zone having an average luminance lower than that of a remainder of the projection zone located in an interior of the projection zone, and
   a device for projecting an additional beam configured to at least partially cover the interior zone.

2. The lighting system as claimed in claim 1, wherein the interior zone comprises an upper limit that is angularly offset with respect to an upper limit of the low beam by an angular value of at least 5° with respect to a point of emission of the low beam.

3. The system as claimed in claim 1, wherein the interior zone is symmetric with respect to a vertical plane passing through an optical axis of the device for projecting the low beam.

4. The system as claimed in claim 1, wherein the interior zone covers an angular sector of less than 10° in horizontal cross section.

5. The system as claimed in claim 1, wherein the average luminance in the interior zone is lower by at least 70% than the average luminance in the remainder of the projection zone of the low beam.

6. A motor-vehicle equipped with at least one system as claimed in claim 1.

7. A motor-vehicle lighting system comprising
a device for projecting a low beam into a projection zone, wherein the projecting device is configured so that the low beam comprises an interior zone having an average luminance lower than that of the remainder of the projection zone located in an interior of the projection zone, and
a device for projecting an additional beam of pixelized rays and configured to at least partially cover the interior zone.

8. The system as claimed in claim 7, wherein the additional beam is configured to produce an outline of at least one pictogram.

9. The system as claimed in claim 7, wherein the interior zone is entirely covered by the additional beam.

10. The system as claimed in claim 7, wherein the device for projecting an additional beam comprises a micromirror-array system.

11. A motor-vehicle lighting system including a device for projecting a low beam into a projection zone, wherein:
the projecting device is configured so that the low beam comprises an interior zone having an average luminance less than that of a remainder of the projection zone located in an interior of the projection zone, and
the device for projecting the low beam includes at least a plurality of modules that are each able to produce a sub-beam that participates in the low beam.

12. The system as claimed in claim 11, wherein the plurality of modules comprises at least one first group of at least one module located on a first side of the optical axis of the device for projecting the low beam, and a second group of at least one module located on a second side of said optical axis.

13. The system as claimed in claim 12, wherein the first group is configured to illuminate only the first side of the optical axis and the second group is configured to illuminate only the second side of the optical axis.

14. The system as claimed in claim 13, wherein the first group is configured to produce a beam comprising a segment of lesser illumination on a lateral beam edge located on the first side of the optical axis and the second group is configured to produce a beam comprising a segment of lesser illumination on a lateral beam edge located on the second side of the optical axis, the segments of lesser illumination participating to form the interior zone.

15. The system as claimed in claim 14, wherein each among the first group and second group is configured to produce a beam having a profile, in a vertical plane perpendicular to the optical axis, with a heightwise constriction in the direction of the optical axis.

16. The system as claimed in claim 13, wherein the first group and second group are configured to produce beams that are symmetric to one another relative to a vertical plane passing through the optical axis.

17. The system as claimed in claim 11, wherein the device for projecting the low beam is configured so that a relative position of at least two sub-beams is modifiable between at least one position wherein the interior zone is present and at least one other position wherein the interior zone is absent.

18. The system as claimed in claim 17, wherein the plurality of modules comprises at least one module that is configured to produce a rotatable sub-beam.

19. The system as claimed in claim 18, wherein the relative position of the sub-beams respectively produced by the modules of the first group and by those of the second group is modifiable.

20. The system as claimed in claim 19, comprising a third group of at least one module located along the optical axis.

* * * * *